(12) United States Patent
Matusik et al.

(10) Patent No.: US 7,609,906 B2
(45) Date of Patent: Oct. 27, 2009

(54) METHOD AND SYSTEM FOR ACQUIRING AND DISPLAYING 3D LIGHT FIELDS

(75) Inventors: Wojciech Matusik, Cambridge, MA (US); Hanspeter Pfister, Arlington, MA (US); Matthias Zwicker, Gerlikon (CH); Fredo Durand, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 735 days.

(21) Appl. No.: 11/397,227

(22) Filed: Apr. 4, 2006

(65) Prior Publication Data

US 2007/0229653 A1    Oct. 4, 2007

(51) Int. Cl.
*G06K 9/40* (2006.01)
(52) U.S. Cl. .................... 382/260; 382/154; 348/59; 359/455; 396/327; 396/330
(58) Field of Classification Search .......... 382/154, 382/260; 359/455, 463, 619, 621; 40/454; 348/59; 396/306, 327, 330; 353/32; 430/228, 430/946
See application file for complete search history.

(56) References Cited

U.S. PATENT DOCUMENTS

| | | | | |
|---|---|---|---|---|
| 5,315,377 A | * | 5/1994 | Isono et al. .................. 348/51 |
| 5,485,308 A | * | 1/1996 | Hirata et al. ................. 359/457 |
| 5,663,831 A | * | 9/1997 | Mashitani et al. ........... 359/463 |
| 6,744,435 B2 | * | 6/2004 | Zwicker et al. .............. 345/424 |
| 2006/0158729 A1 | * | 7/2006 | Vissenberg et al. ......... 359/462 |

OTHER PUBLICATIONS

Tanimoto, FTV (Free Viewpoint Television) Creating Ray-Based Image Engineering, Sep. 11-14, 2005, IEEE International Conference on Image Processing, 2005, vol. 2,pp. not numbered: has four pages total:sections 1-6.*
Konrad et al. (Artifact reduction in lenticular multiscopic 3-D displays by means of anti-alias filtering, Jan. 20-24, 2003, SPIE Symposium on Electronic Imaging, Image and Video Communications and Processing,pp. 1-12.*
Yamamoto et al., Enlargement of viewing area of stereoscopic full-color LED display by use of a parallax barrier, Nov. 10, 2002, Applied Optics, vol. 41, No. 32,pp. 6907-6919.*
Fuji et al., Free-Viewpoint TV System Based on Ray-Space Representation, 2002, Proceedings of SPIE:Three-Dimensional TV,Video and Display, vol. 4864, pp. 175-189.*
Moller C N et al., "Correcting Interperspective Aliasing in Autostereoscopic Displays" IEEE Transactions on Visualization and Computer Graphics, IEEE Service Center, Los Alamitos, CA, US; vol. 11, No. 2, Mar. 2005 pp. 228-236.

(Continued)

*Primary Examiner*—Matthew C Bella
*Assistant Examiner*—Dennis Rosario
(74) *Attorney, Agent, or Firm*—Dirk Brinkman; Gene Vinokur

(57) ABSTRACT

A method and system acquire and display light fields. A continuous light field is reconstructed from input samples of an input light field of a 3D scene acquired by cameras according to an acquisition parameterization. The continuous light is reparameterized according to a display parameterization and then prefiltering and sampled to produce output samples having the display parametrization. The output samples are displayed as an output light field using a 3D display device.

8 Claims, 9 Drawing Sheets

OTHER PUBLICATIONS

Chai, J. X., Chan, S. C., Shum, H. Y., and Tong, X. Plenoptic sampling. In *Computer Graphics, Proceedings of SIGGRAPH 2000*.

Fehn, C., Kauff, P., De Beeck, M. O., Ernst, F., Ijsselsteijn, W., Pollefeys, M., Gool, L. V., Ofek, E., and Sexton, I. 2002. An evolutionary and optimised approach on 3D-TV. In *Proceedings of International Broadcast Conference*, 357-365.

Gortler, S., Grzeszczuk, R., Szeliski, R., and Cohen, M. The lumigraph. In *Computer Graphics*, 1996.

Halle, M. 1994. Holographic stereograms as discrete imaging systems. In *Practical Holography VIII*, vol. 2176 of *SPIE Proceedings*, 73-84.

Heckbert, P. 1989. *Fundamentals of Texture Mapping and Image Warping*. Ucb/csd 89/516, U.C. Berkeley.

Isaksen, A., McMillan, L., and Gortler, S. J. 2000. Dynamically reparameterized light fields. In *Computer Graphics*, SIGGRAPH 2000 Proceedings.

Jones, G. R., Lee, D., Holliman, N. S., and Ezra, D. 2001. Controlling perceived depth in stereoscopic images. In *Proc. SPIE* vol. 4297, *Stereoscopic Displays and Virtual Reality Systems VIII*, 42-53.

Konrad, J., and Agniel, P. 2005. Subsampling models and anti-alias filters for 3-d automultiscopic displays. *IEEE Trans. Image Proc.*

Levoy, M., and Hanrahan, P. 1996. Light field rendering. In *Computer Graphics*, SIGGRAPH 96 Proceedings, 31-42.

Matusik, W., and Pfister, H. 2004. 3d tv: A scalable system for realtime acquisition, transmission, and autostereoscopic display of dynamic scenes. *ACM Transaction on Graphics 23*, Aug. 3, 811-821.

Ng, R. 2005. Fourier slice photography. *ACM Trans. Graph. 24*, 3, 735-744.

Perlin, K., Paxia, S., and Kollin, J. 2000. An autostereoscopic display. In *SIGGRAPH 2000 Conference Proceedings*, vol. 33, 319-326.

Sandin, D., Margolis, T., GE, J., Girado, J., Peterka, T., and Defanti, T. 2005. The varrier TM autostereoscopic virtual reality display. *ACM Transactions on Graphics 24*, 3, 894-903.

Stewart, J., Yu, J., Gortler, S., and McMillan, L. 2003. A new reconstruction filter for undersampled light fields. In *Eurographics Symposium on Rendering*, ACM International Conference Proceeding Series, 150-156.

Wartell, Z., Hodges, L. F., and Ribarsky, W. 1999. Balancing fusion, image depth and distortion in stereoscopic head-tracked displays. In *SIGGRAPH '99: Proceedings of the 26th annual conference on Computer graphics and interactive techniques*, 351-358.

Wilburn, B., Smulski, M., Lee, H. K., and Horowitz, M. 2002. The light field video camera. In *Media Processors 2002*, vol. 4674 of *SPIE*, 29-36.

\* cited by examiner

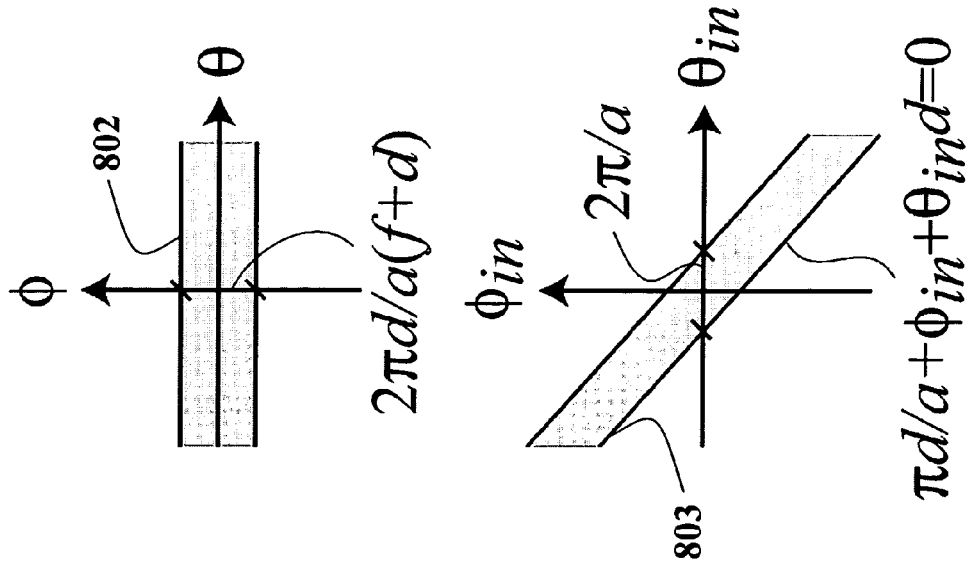
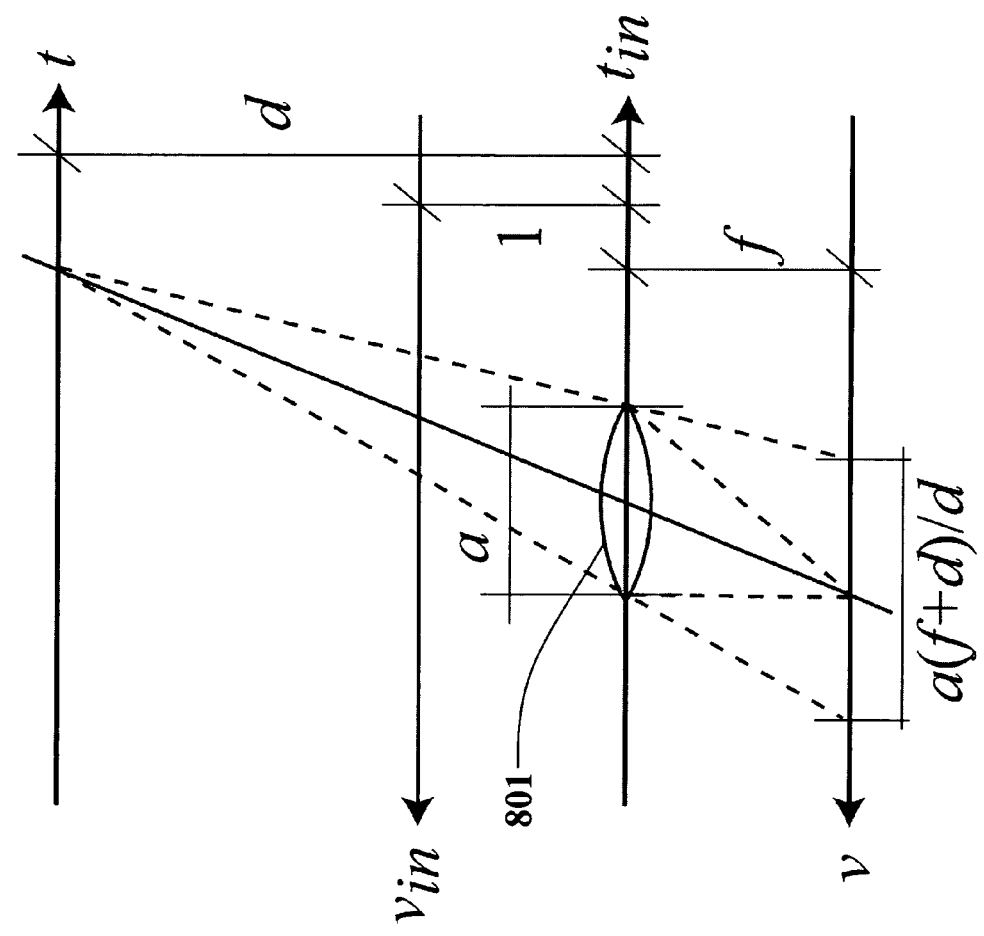

METHOD AND SYSTEM FOR ACQUIRING AND DISPLAYING 3D LIGHT FIELDS

FIELD OF THE INVENTION

This invention relates generally to acquiring and displaying light fields, and more particularly to acquiring light fields with an array of cameras, and resampling the light fields for display onto automultiscopic display devices.

BACKGROUND OF THE INVENTION

It is desired to acquire images of real-world 3D scenes and display them as realistic 3D images. Automultiscopic displays offer uninhibited viewing, i.e., without glasses, of high-resolution stereoscopic images from arbitrary positions in a viewing zone. Automultiscopic displays include view-dependent pixels with different intensities and colors based on the viewing angle. View-dependent pixels can be implemented using conventional high-resolution displays and parallax-barriers.

In a typical automultiscopic display, images are projected through a parallax-barrier onto a lenticular sheet or an integral lens sheet. The optical principles of multiview auto-stereoscopy have been known for over a century, Okoshi, *Three-Dimensional Imaging Techniques*, Academic Press, 1976. Practical displays with a high resolution have recently become available. As a result, 3D television is receiving renewed attention.

However, automultiscopic displays have several problems. First, a moving viewer sees disturbing visual artifacts. Secondly, the acquisition of artifact-free 3D images is difficult. Photographers, videographers, and professionals in the broadcast and movie industry are unfamiliar with the complex setup required to record 3D images. There are currently no guidelines or standards for multi-camera parameters, placement, and post-production processing, as there are for conventional 2D television.

In particular, the pixels in the image sensor, i.e., the camera, do not map directly to pixels in the display device, in a one-to-one manner, in most practical cases. This requires resampling of the image data. The resampling needs to be done in such a way that visual artifacts are minimized. There is no prior art for effective resampling of light fields for automultiscopic displays.

Most prior art anti-aliasing for 3D displays uses wave optics. All known methods do not handle occlusion and specular surfaces correctly. Furthermore, those methods require scene depth on a per pixel basis for appropriate filtering. In the absence of depth information, the methods resort to a conservative worst case approach and filter based on a maximum depth in the scene. In practice, this limits implementations to scenes with very shallow depths.

Generally, automultiscopic displays emit static or time-varying light fields. A light field represents radiance as a function of position and direction in regions of space free of occluders. A frequency analysis of light fields is done using a plenoptic sampling theory. There, the spectrum of a scene is analyzed as a function of object depth. This reveals that most light fields are aliased. A reconstruction filter can be applied to remove aliasing and to preserve, as much as possible, the original spectrum.

Re-parameterization can be used to display light fields on automultiscopic displays. However, reparameterization does not address display aliasing. The reconstruction filter can be enhanced with a wide aperture filter. This can produce 3D images with a larger depth of field without sacrificing the sharpness on the focal plane.

None of the prior art methods deal with sampling and anti-aliasing for automultiscopic displays. They do not take into account the sampling rate of the display, and only consider the problem of removing aliasing from sampled light fields during reconstruction.

SUMMARY OF THE INVENTION

The invention provides a three-dimensional display system that can be used for television and digital entertainment. Such a display system requires high quality light field data. Light fields are acquired using a camera array, and the light field is rendered on a discrete automultiscopic display. However, most of the time, the acquisition device and the display devices have different sampling patterns.

Therefore, the invention resamples the light field data. However, resampling is prone to aliasing artifacts. The most disturbing artifacts in the display of light field data are caused by inter-perspective aliasing.

The invention provides a method for resampling light fields that minimizes such aliasing. The method guarantees a high-quality display of light fields onto automultiscopic display devices. The method combines a light field reconstruction filter and a display prefilter that is determined according to a sampling grid of the display device.

In contrast with prior art methods, the present resampling method does not require depth information. The method efficiently combines multiple filtering stages to produce high quality displays. The method can be used to display light fields onto a lenticular display screen or a parallax-barrier display screen.

BRIEF DESCRIPTION OF THE DRAWINGS

FIG. 8A is a schematic of parameter planes of a camera according to an embodiment of the invention;

FIG. 8B is a schematic of an approximation of the spectrum of a camera aperture filter according to an embodiment of the invention; and FIG. 8C is a schematic of the bandwidth of the spectra shown in FIG. 8B.

DETAILED DESCRIPTION OF THE PREFERRED EMBODIMENT

System Overview

Figure 1A:
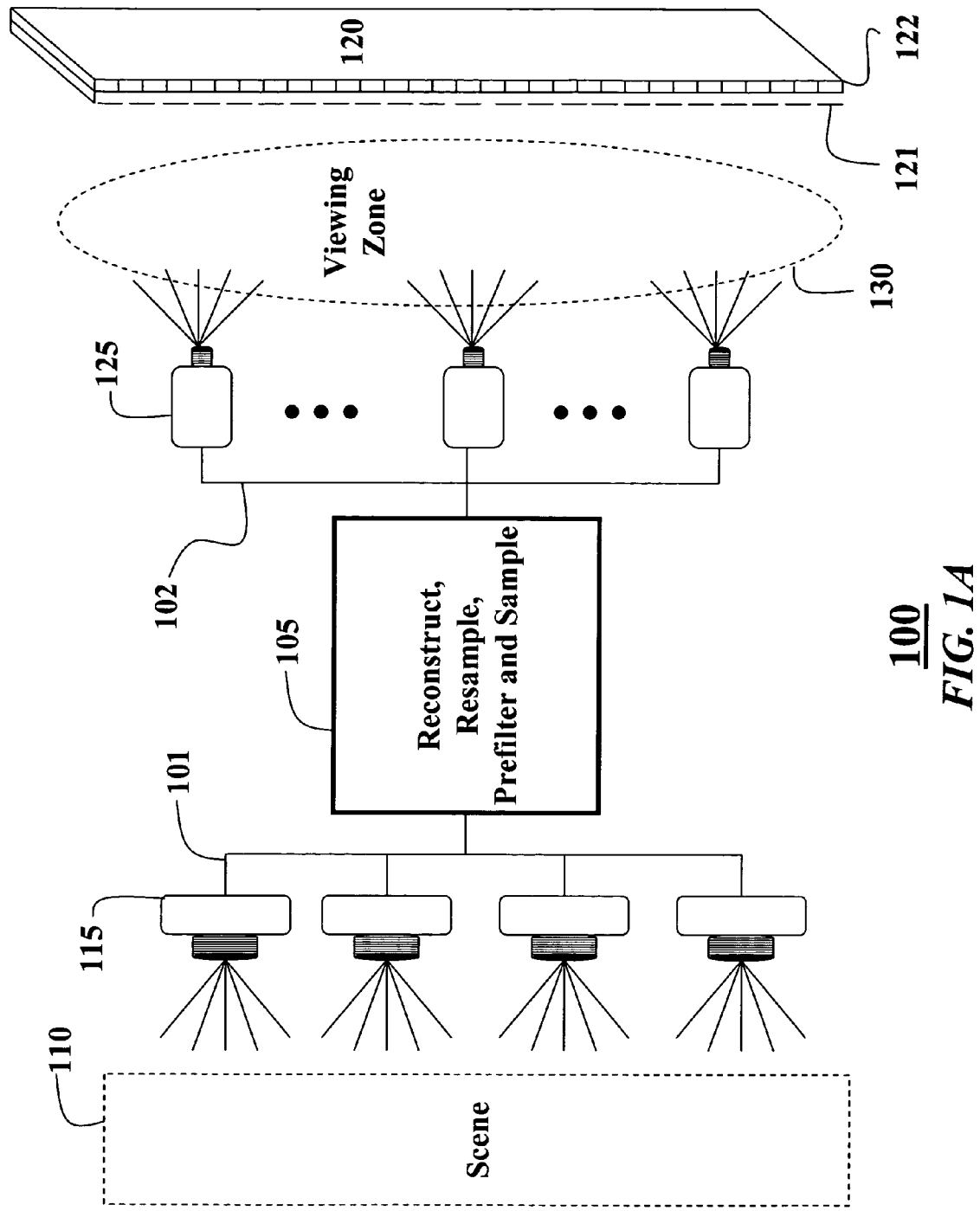
FIG. 1A is a top view schematic of a system for acquiring and displaying a 3D light field on a 3D display device according to an embodiment of the invention.

FIG. 1 shows a light field acquisition system 100 according to an embodiment of our invention. Multiple cameras 115 acquire sequences of images 101, e.g., videos, of a scene 110. The cameras can be arranged as a horizontal linear array. Preferably the cameras are synchronized with each other. The input image sequences are processed according to a method 105 of the invention. The processing includes reconstruction, resampling, prefiltering and sampling steps, to produce sequences of output images 102. The output images are then displayed onto an automultiscopic display device 120 by multiple projectors 125. The projectors can also be synchronized and arranged as a horizontal linear array. The display device 120 includes a parallax-barrier 121 mounted on a vertically oriented lenticular screen 122 on a side facing the projectors and a viewing zone 130.

Because the discrete input samples in the acquired input images 101 have a low spatial resolution and a high angular resolution while the discrete output samples in the displayed output images 102 have a high spatial resolution and a low angular resolution, the resampling is required to produce an artifact free display.

Method Overview

Figure 1B:
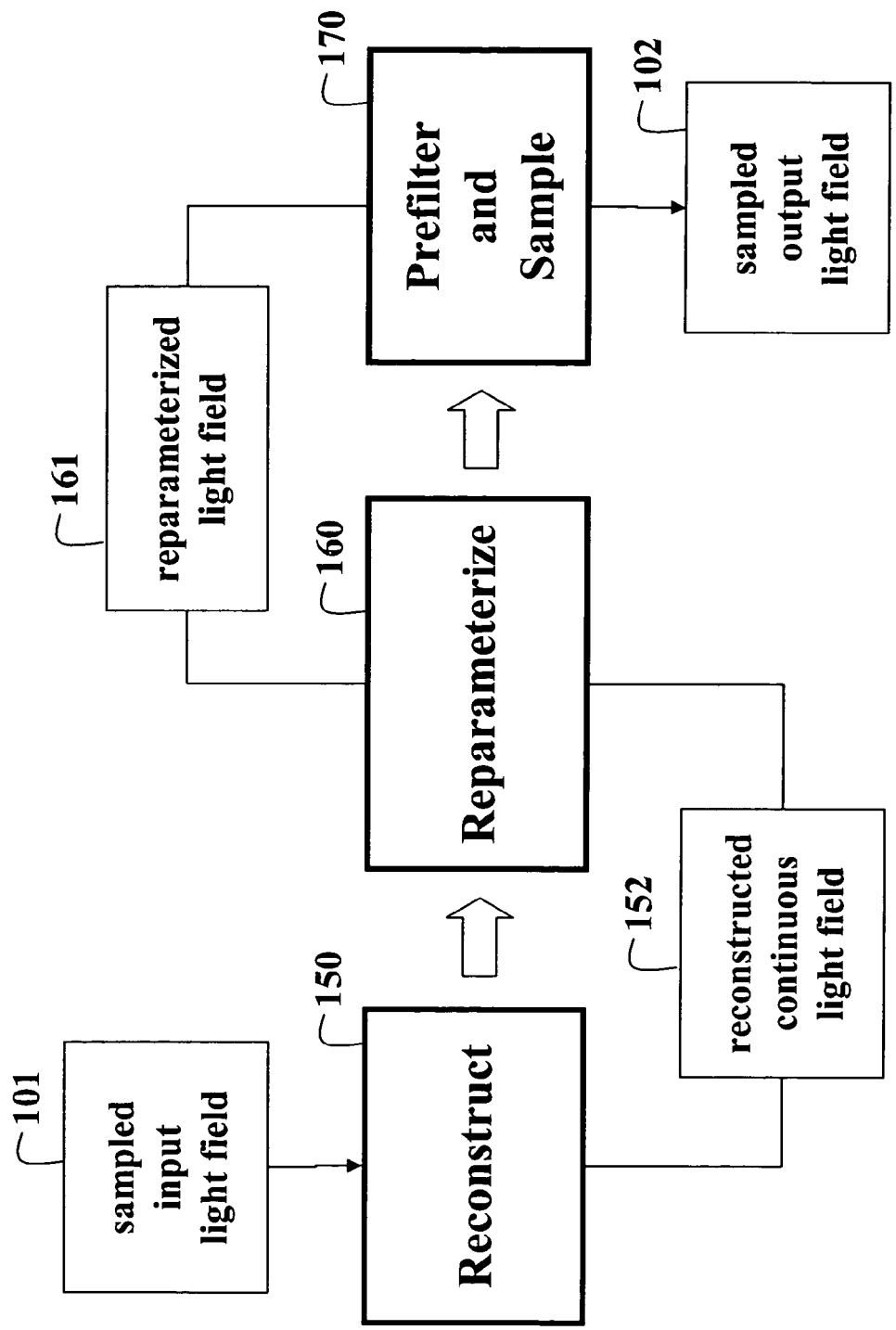
FIG. 1B is a flow diagram of a method for resampling and antialiasing a light field according to an embodiment of the invention.

As shown in FIG. 1B, the method 105 proceeds in three steps. Generally, we represent signals and filters in a frequency domain. First, a continuous signal 152 is reconstructed 150 from the input images 101. We apply known reconstruction filters. Next, we reparameterize 160 the signal to the display coordinates producing a reparameterized light field 161. In the last step 170, the signal is then prefiltered to match the Nyquist limit of the display pixel grid and sampled onto the display pixel grid as output images 102.

Display Parametrization

Figure 2:
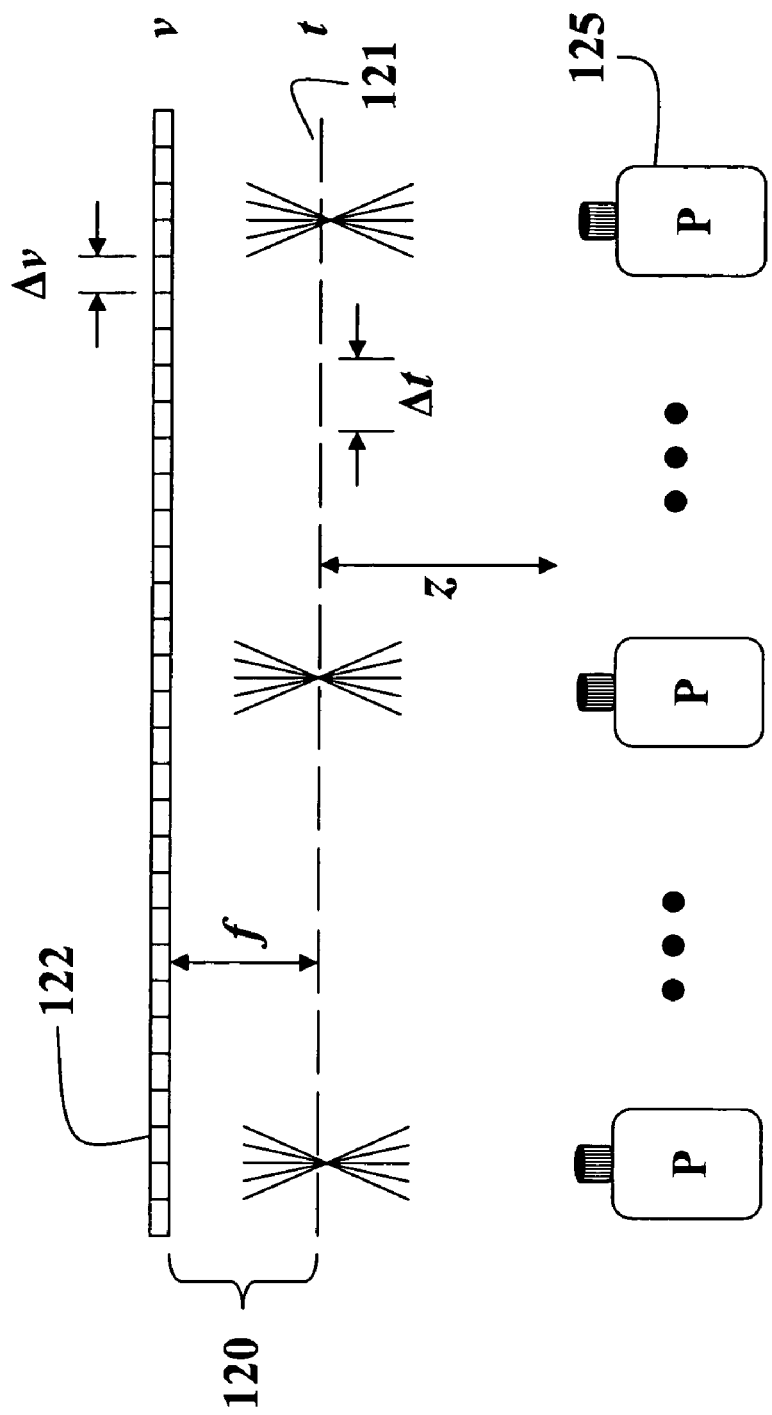
FIG. 2 is a schematic of display parameterization according to an embodiment of the invention.

FIG. 2 shows the parameterization for the multiview autostereoscopic display device 120. This parameterization attempts to reproduce a light array for every location and direction in the viewing zone 130. We parameterize light rays by their intersection with two planes. For the display device 120, we use the parallax-barrier plane 121 as t coordinates, and the high resolution screen 122 as v coordinates. Note that the v coordinates of a ray are relative to their intersection with the t plane. The pixel spacing of the screen 122 is $\Delta v$, the spacing of the gaps in the barrier 121 is $\Delta t$, the separation between the screen and barrier is f, and depth is generally indicated by z.

All rays intersecting the t-plane at one location correspond to one multi-view pixel, and each intersection with the v-plane is a view-dependent subpixel. We call the number of multi-view pixels the spatial resolution and the number of view-dependent subpixels per multi-view pixel the angular resolution.

Figure 3:
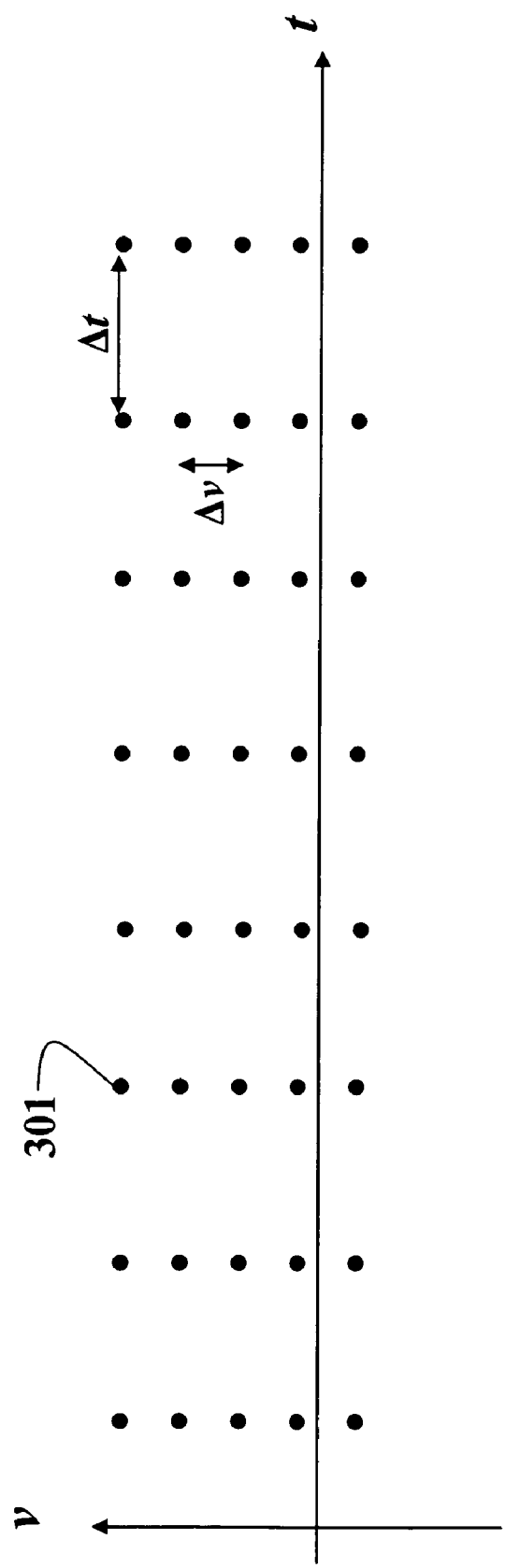
FIG. 3 is a quadriateral sampling grid according to an embodiment of the invention.

As shown in FIG. 3, the display rays form a higher-dimensional grid in ray space. Most prior physical displays do not correspond to a quadrilateral sampling grid as shown in FIG. 3. Each ray in FIG. 2 corresponds to one sample point 301 in FIG. 3. Most automultiscopic displays only provide for horizontal parallax, i.e., the displays sample only in the horizontal direction on the v-plane. Hence, we can treat each scan line on the t-plane independently, which leads to a two-dimensional ray space.

We use the term display view to denote a slice of ray space with v=const. Note, the display views are parallel projections of the scene. Without loss of generality, we assume the distance f between the planes v and t is normalized to 1. This ray space interpretation of 3D displays enables us to understand their bandwidth, depth of field, and prefiltering.

Bandwidth

Figure 4:
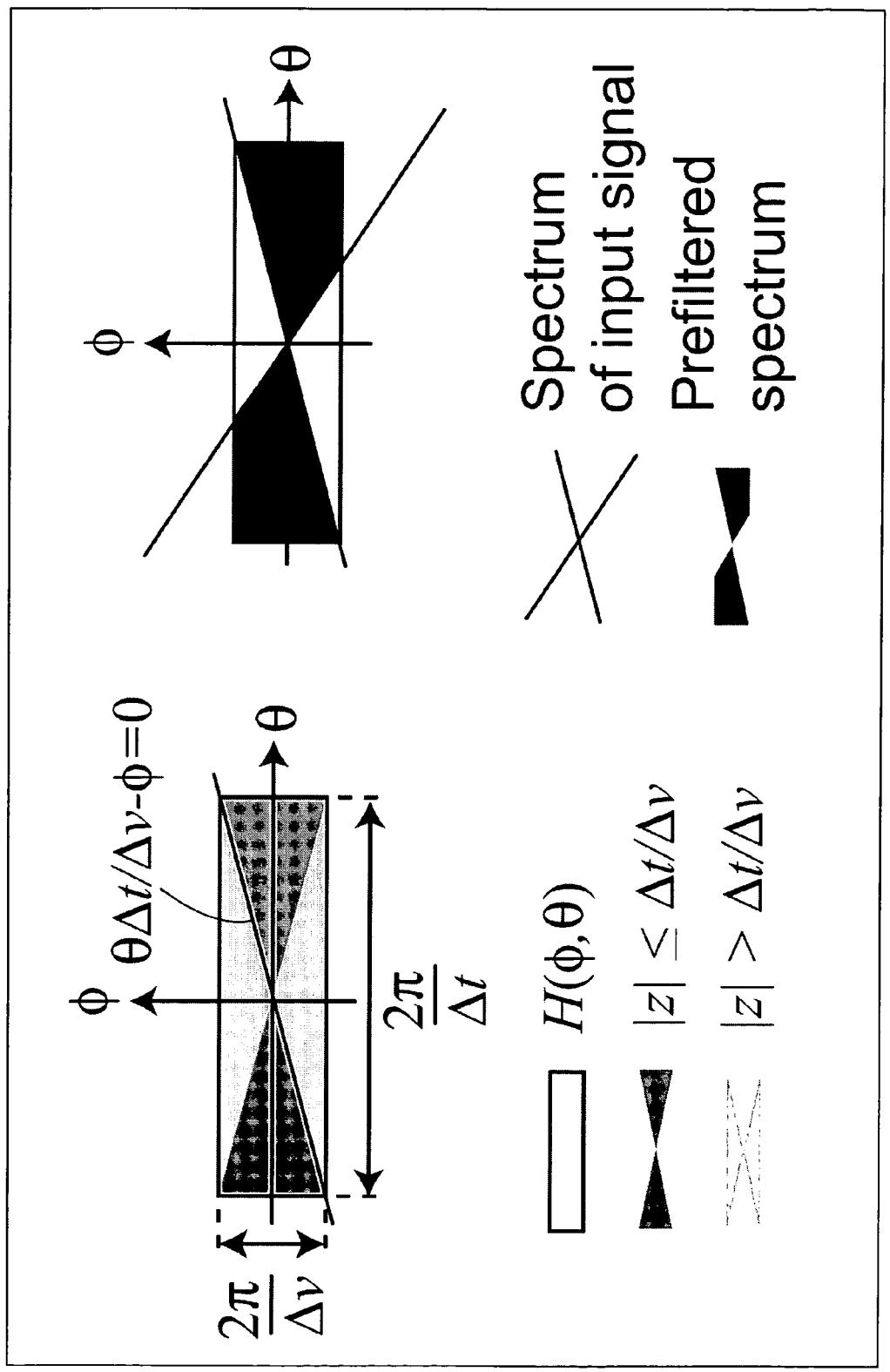
FIG. 4 is a schematic of bandwidth requirements according to an embodiment of the invention.

As shown in FIG. 4, the sampling grid in FIG. 3 imposes a strict limit on the bandwidth that can be represented by the display. This is known as the Nyquist limit. We denote angular and spatial frequencies by $\phi$ and $\theta$, and sample spacing by $\Delta v$ and $\Delta t$. Then the display bandwidth, H, is given by $$H(\phi, \theta) = \begin{cases} 1 & \text{for } |\phi| \leq \pi/\Delta v \text{ and } |\theta| \leq \pi/\Delta t \\ 0 & \text{otherwise} \end{cases} \quad (1)$$

Depth of Field

The depth of field of the display is given by the diagonals of its rectangular bandwidth with arbitrary relative scaling of the $\phi$ and $\theta$ axes. We selected the scaling to reflect the relative resolution of the two axes, which is usually two orders of magnitude larger in the spatial direction ($\theta$ axis), than in the angular direction ($\phi$ axis).

The spectrum of a light field, or ray space signal, of a scene with constant depth is given by a line $\phi/z+\theta=0$, where z is the distance from the t-plane, as shown in FIG. 2. For scenes at depths $|z| \leq \Delta t/\Delta v$, the spectral lines intersect the rectangular display bandwidth on its left and right vertical boundary. This means these scenes can be shown at the highest spatial resolution $\theta = \pi/\Delta t$ of the display. However, for scenes with $|z| > \Delta t/\Delta v$, the spectra intersect the display bandwidth on the horizontal boundary. As a consequence, their spatial frequencies are reduced to $\theta = \pi/\Delta v$. This is below the spatial resolution of the display, and these scenes would appear blurry.

This behavior is similar to photographic depth of field effects and the range of exact refocusing in light field photography. The range $|z| \leq \Delta t/\Delta v$ is the range that can be reproduced by a 3D display at maximum spatial resolution. We call this the depth of field of the display. Similar to light field photography, the depth of field is proportional to $1/\Delta v$, or the Nyquist limit in the angular dimension.

Because available displays have a very limited angular bandwidth, the displays exhibit a shallow depth of field. For example, if $\Delta v = 0.0625$ mm and $\Delta t = 2$ mm, then the depth of field is only ±32 mm. This means that any scene element that appears at a distance larger than 32 mm from the display surface would be blurry. With a pitch of 0.25 mm for the view-dependent subpixels and a distance of 4 mm between the high-resolution screen and the parallax-barrier, this corresponds to eight views and a field-of-view of about 25 degrees. Although this seems like a very small range, it is sufficient to create a convincing illusion of depth perception for viewing distances up to a few meters in the viewing zone.

To characterize scenes with respect to a given display, it is useful to specify scene depth relative to the depth of field of the display. Interestingly, the ratio of scene depth over depth of field, $d(z) = z\Delta v/\Delta t$, corresponds to the disparity between views on the display. By this definition, scenes with maximum disparity $d<1$ lie within the depth of field of the display. A given disparity $d>1$ means that the spatial bandwidth is reduced by a factor of $1/d$.

Prefiltering

When sampling a continuous signal, we need to band-limit the signal to avoid aliasing. From Equation 1, we see that for 3D displays this is a simple matter of multiplying the input spectrum by the spectrum of the display prefilter H that discards all portions of the input outside the rectangular display bandwidth, see FIG. 4, right. Note that this prefilter only deals with aliasing due to the display grid and does not take into account aliasing that can occur during light field acquisition.

Prior art bandwidth analysis of 3D displays is mostly based on wave optics or geometric criteria, as opposed to signal processing according to the embodiments of the invention. While wave optics is useful to study diffraction effects, they are not effective for analyzing discrete 3D displays, which operate far from the diffraction limit.

In contrast to our approach, prior art techniques derive a model of display bandwidth that requires an explicit knowledge of scene depth. Those techniques advocate depth-dependent filtering of 2D input images. Band-limiting each 2D view separately is challenging, because filtering needs to be spatially varying. One solution applies a linear filter corresponding to the maximum depth in the scene to each view. However, that wastes a large part of the available display bandwidth and leads to overly blurry results. In contrast, with our method, pre-filtering is a linear operation in ray space.

Without our prefiltering, aliasing appears as ghosting artifacts. Our resampling preserves spatial frequencies around the zero-disparity plane, i.e., around the t-plane in the ray space parameterization of the display.

Resampling for 3D Displays

Above, we analyze the bandwidth of automultiscopic displays and how continuous input signals need to be pre-filtered to avoid aliasing. However, in practice, light fields are represented as sampled signals, which are usually acquired using camera arrays. To show a sampled light field on an automultiscopic display, the samples 101 of the input light field need to be mapped to the samples 102, i.e., pixels, of the display.

Unfortunately, the sampling patterns of typical light field acquisition devices, such as a camera array, and automultiscopic displays do not lead to a one-to-one correspondence of rays. Hence, showing a light field on an automultiscopic display involves a resampling operation.

We now describe a resampling framework that avoids aliasing artifacts due to both sampling steps involved during light field acquisition and light field displaying, i.e., the sampling that occurs during scene acquisition, and the sampling that is performed when mapping camera samples to display pixels.

Our technique is based on a resampling methodology described by Heckbert, *Fundamentals of Texture Mapping and Image Warping*, Ucb/csd 89/516, U. C. Berkeley, 1989, incorporated herein by reference. However, that resampling is for texture mapping in computer graphics. In contrast, we resample a real-world light field.

We describe how to reparameterize the input light field and represent it in the same coordinate system as the display. This enables us to derive a resampling filter that combines reconstruction and prefiltering, as described below.

Reparameterization

Before deriving our combined resampling filter, we need to establish a common parameterization for the input light field and the 3D display. We restrict the description to the most common case where the light field parameterizations are parallel to the display.

The input coordinates of the camera and the focal plane are designated by $t_{in}$ and $v_{in}$, respectively, the distance or depth from the $t_{in}$ axis by $Z_{in}$, and the inter-sampling distances by $\Delta t_{in}$ and $\Delta v_{in}$. The $t_{in}$ axis is also called the camera baseline. Similarly, we use display coordinates $t_d$, $v_d$, $z_d$, $\Delta t_d$, and $\Delta v_d$. Without loss of generality, we assume that the distance between the t- and v-planes for both the display and the input light field is normalized to 1.

The relation between input and display coordinates is given by a single parameter $f_{in}$, which is the distance between the camera plane $t_{in}$ and the zero-disparity plane $t_d$ of the display. This translation corresponds to a shear in ray space $$\begin{bmatrix} v_{in} \\ t_{in} \end{bmatrix} = \begin{bmatrix} 1 & 0 \\ f_{in} & 1 \end{bmatrix} \begin{bmatrix} v_d \\ t_d \end{bmatrix} = M \begin{bmatrix} v_d \\ t_d \end{bmatrix}. \quad (2)$$

M is the 2×2 matrix in the middle part of this equation.

Automultiscopic displays usually have a high spatial resolution, e.g., several hundred multiview-pixels per scan line, and low angular resolution, e.g., about ten view-dependent sub-pixels. In contrast, the acquired light fields have a low spatial resolution, e.g., a few dozen cameras, and high angular resolution, e.g., several hundred pixels per scan line.

Figure 5:
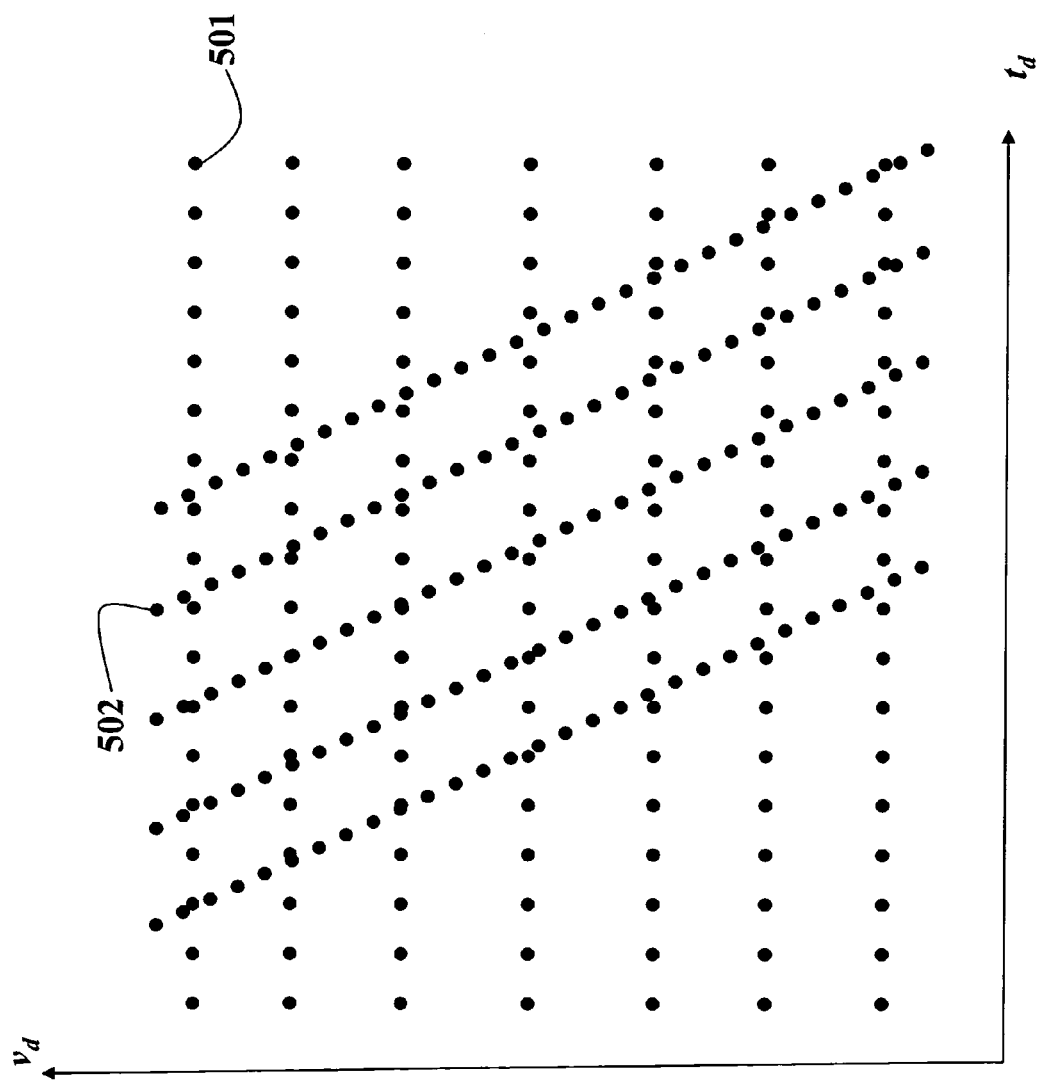
FIG. 5 is a schematic superimposing scan line samples of a camera and a display device according to an embodiment of the invention.

As shown in FIG. 5, this leads to two sampling grids that are highly anisotropic and that are skewed with respect to each other. In FIG. 5, samples 501 represent display scan line samples, and samples 502 represent camera scan line samples.

Combined Resampling Filter

Figure 6:
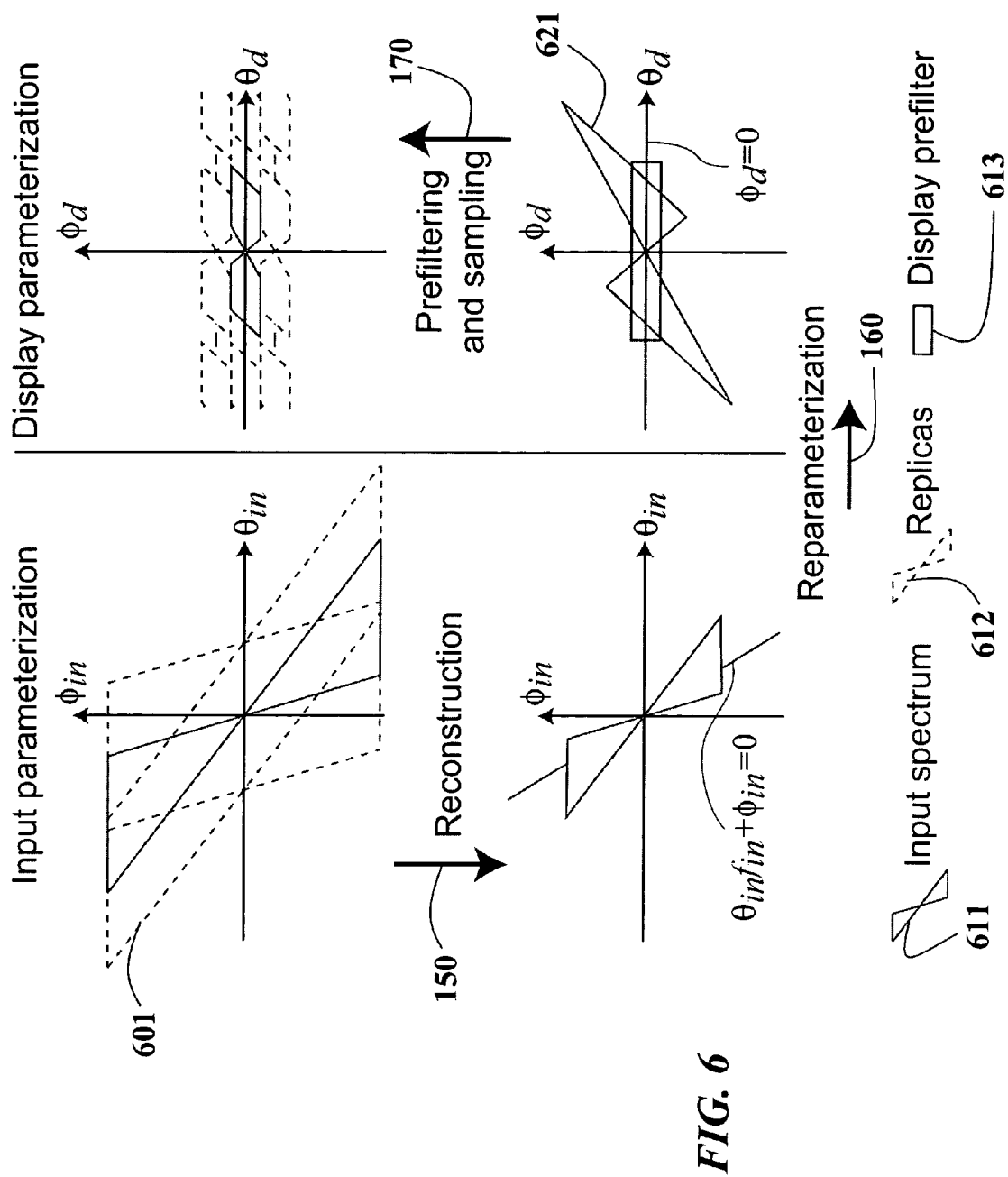
FIG. 6 is a schematic of a method for sampling and filtering according to an embodiment of the invention.

FIG. 6 shows the resampling method in greater detail. The left side is the input parametrization, the right side the output parameterization, and the bottom the reparameterization from the acquisition space to the display space. FIG. 6 symbolically shows the input spectrum 611, replicas 612, and filters 613.

As shown in FIG. 6, the resampling method for 3D display antialiasing proceeds in three steps where we represent signals and filters in the frequency domain. First, a continuous signal is reconstructed 150 from the input data 101 given in its original input parameterization 601, which we denote by angular and spatial frequencies $\phi_{in}$ and $\theta_{in}$.

Care has to be taken to avoid aliasing problems in this step and to make optimal use of the input signal. We apply known reconstruction filters for light field rendering, see Stewart et al., "A new reconstruction filter for undersampled light fields," *Eurographics Symposium on Rendering*, ACM International Conference Proceeding Series, pp. 150-156, 2003, and Chai et al., "Plenoptic sampling," *Computer Graphics*, SIGGRAPH 2000 Proceedings, pp. 307-318, both incorporated herein by reference.

These techniques extract a maximum area of the central replica from the sampled spectrum, while discarding areas that overlap with neighboring replicas.

Next, we reparameterize 160 the reconstructed signal to display coordinates 621, denoted by $\phi_d$ and $\theta_d$, using the mapping described above.

Then, in the last step 170, the signal is prefiltered to match the Nyquist limit of the display pixel grid as described above, and sampled onto the display pixel grid. The prefiltering guarantees that replicas of the sampled signal in display coordinates do not overlap. This avoids blurring effects.

We now derive a unified resampling filter by combining the three steps described above. We operate in the spatial domain, which is more useful for practical implementation. We proceed as follows:

1. Given samples $\xi_{i,j}$ of an input light field 101, we reconstruct 150 a continuous light field $l_{in}$ 152:

$$l_{in}(v_{in}, t_{in}) = \sum_{i,j} \xi_{i,j} r\left( \begin{bmatrix} v_{in} - i\Delta v_{in} \\ t_{in} - j\Delta t_{in} \end{bmatrix} \right), \quad (3)$$

where r denotes the light field reconstruction kernel.

2. Using Equation (2), we reparameterize 160 the reconstructed light field 152 to display coordinates 161 according to:

$$l_d(v_d, t_d) = l_{in}\left(M\begin{bmatrix} v_d \\ t_d \end{bmatrix}\right). \quad (4)$$

3. We convolve the reconstructed light field, represented in display coordinates, with the display prefilter h, which yields a band-limited signal $$\tilde{l}_d(v_d, t_d) = (l_d \otimes h)(v_d, t_d). \quad (5)$$

Sampling this signal on the display grid does not produce any aliasing artifacts.

By combining the above three steps, we express the band-limited signal as a weighted sum of input samples $$\tilde{l}_d(v_d, t_d) = \sum_{i,j} \xi_{i,j} \rho\left(\begin{bmatrix} v_d \\ t_d \end{bmatrix} - M^{-1}\begin{bmatrix} i\Delta v_{in} \\ j\Delta t_{in} \end{bmatrix}\right). \quad (6)$$

The weighting kernel ρ is the so-called resampling filter. It is defined as the convolution of the reconstruction kernel, expressed in display coordinates, and the prefilter $$\rho(v_d, t_d) = (r(M[\cdot]) \otimes h)(v_d, t_d). \quad (7)$$

We implemented all light field resampling filters using conventional Gaussians functions.

Because both the reconstruction filter and the prefilter are highly anisotropic, we carefully align the filters to preserve as much signal bandwidth as possible. Note that Equation (2) implies $[\phi_{in}, \theta_{in}] = [\phi s, \theta_d] M^{-1}$. Therefore, the input spectrum is sheared along the vertical axis.

We also note that the line $\theta_{in} f_{in} + \phi_{in} = 0$, corresponding to depth $z_{in} = f_{in}$ is mapped to the zero-disparity plane of the display. Hence, the depth of field of the display, expressed in input coordinates, lies at distances $f_{in} = \Delta t/\Delta v$ from the cameras. This means that the distance $f_{in}$ between the camera plane and the display plane is selected such that, for objects of interest, $z_{in} - f_{in} = zd < \Delta t/\Delta v$.

Baseline and Depth of Field

The relation between the input light field and the output light field as described above implies that the display acts as a virtual window to a uniformly scaled scene. The display reproduces the light field of the scene at a different, usually smaller, scale. However, often it is neither desirable nor practically possible to achieve this.

It is not unusual that the depth range of the scene by far exceeds the depth of field of the display, which is relatively shallow. This means that large parts of the scene are outside the display bandwidth, which may lead to overly blurred views. In addition, for scenes where the objects of interest are far from the cameras, like in outdoor settings, the above assumption means that a very large camera baseline is required. It would also mean that the pair of stereoscopic views seen by an observer of the display would correspond to cameras that are physically far apart, much further than the two eyes of an observer in the real scene.

The problems can be solved by changing the size of the camera baseline. This can be expressed as an additional linear transformation of the input light field that reduces the displayed depth of the scene. This additional degree of freedom enables us to specify a desired depth range in the input scene that needs to be in focus. We deduce the required baseline scaling that maps this depth range to the display depth of field.

Baseline Scaling

Figure 7:
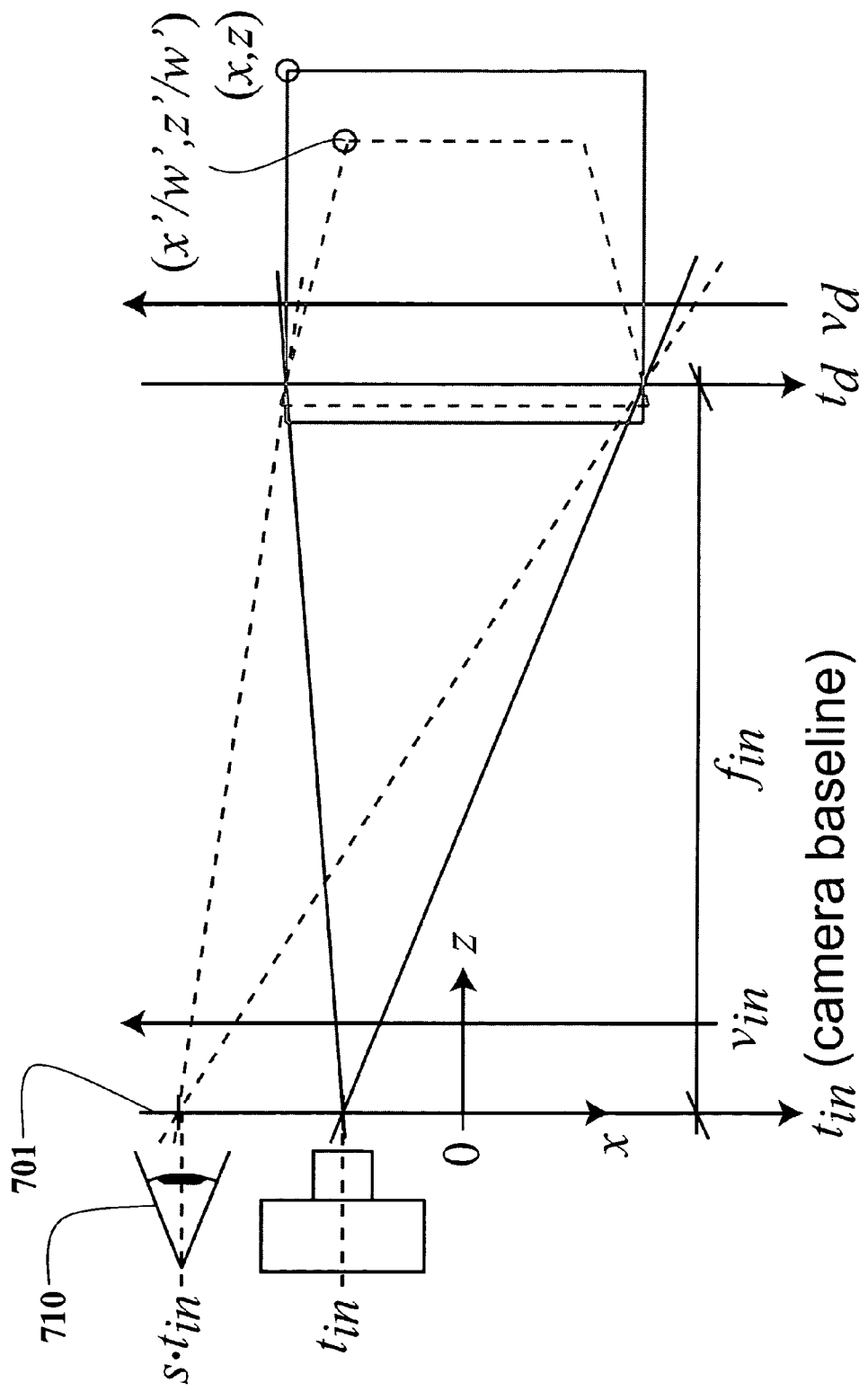
FIG. 7 is a schematic of a transformation from a light field acquisition geometry to a light field display geometry according to an embodiment of the invention.

As shown in FIG. 7, modifying the camera baseline $t_{in}$ 701 during acquisition corresponds to the transformation of the displayed configuration. In FIG. 7, the solid lines indicates the acquisition geometry, and the dashed lines the display geometry.

An observer 710 at a given position sees the perspective view that is acquired by a camera closer to the center of the baseline. That is, we remap each acquired camera ray such that its intersection with the baseline plane $t_{in}$ is scaled by a factor s>1, while its intersection with the zero-disparity plane of the display, i.e., the $t_d$-plane, is preserved.

This mapping corresponds to a linear transformation of input ray space, and any linear transformation of ray space corresponds to a projective transformation of the scene geometry. For the transformation shown in FIG. 7, the projective transformation is $$\begin{bmatrix} x' \\ z' \\ w' \end{bmatrix} = \begin{bmatrix} sf_{in} & 0 & 0 \\ 0 & sf_{in} & 0 \\ 0 & s-1 & f_{in} \end{bmatrix} \begin{bmatrix} x \\ z \\ 1 \end{bmatrix}. \quad (8)$$

i.e., a point (x, z) in the scene is mapped to (x'/w', z'/w'). The projective transformation of scene geometry is also illustrated in FIG. 7. This scene transformation is closely related to depth reduction techniques used with stereoscopic displays, which are used to aid stereo-view fusion. This transformation moves points at infinity, i.e., z=∞, to a finite depth $$z'/w' = (f_{in} s/(s-+1 f_{in}).$$

In addition, as s approaches infinity, z'/w' approaches $f_{in}$. This means that scene depth is compressed towards the zero-disparity plane of the display. We generalize the transformation from display to input coordinates by including the mapping shown in FIG. 7, which leads to $$\begin{bmatrix} v_{in} \\ t_{in} \end{bmatrix} = \begin{bmatrix} \frac{1}{f_{in}} & 0 \\ 0 & 1 \end{bmatrix} \begin{bmatrix} 1 & s-1 \\ 0 & s \end{bmatrix}^{-1} \begin{bmatrix} \frac{f_{in}}{f_d} & 0 \\ \frac{f_{in}}{f_d} & 1 \end{bmatrix} \begin{bmatrix} v_d \\ t_d \end{bmatrix} \quad (9)$$

$$= M(f_{in}, s) \begin{bmatrix} v_d \\ t_d \end{bmatrix}.$$

We call this mapping $M(f_{in}, s)$ to emphasize that it is determined by the free parameters $f_{in}$ and s.

Controlling Scene Depth of Field

In a practical application, a user wants to ensure that a given depth range in the scene is mapped into the depth of field of the display and appears sharp. Recall that the bandwidth of scene elements within a limited depth range is bounded by two spectral lines. In addition, the depth of field of the display is given by the diagonals of its rectangular bandwidth. Using the two free parameters in Equation (9), s for scaling the baseline and $f_{in}$ for positioning the zero-disparity plane of the display with respect to the scene, we determine a mapping that aligns these two pairs of lines, which achieves the desired effect.

We determine the mapping by equating the two corresponding pairs of spectral lines, i.e., the first pair bounds the user specified depth range mapped to display coordinates, and the second pair defines the depth of field of the display. Let us denote the minimum and maximum scene depth, $z_{min}$ and $z_{max}$, which the user desires to be in focus on the display by $z_{front}$ and $z_{back}$. The solution for the parameters s and $f_{in}$ is $$f_{in} = \frac{2z_{max}z_{min} + \frac{\Delta t}{\Delta v}(z_{max} - z_{min})}{(z_{min} + z_{max})}, \quad (10)$$

$$s = \frac{\frac{\Delta v}{\Delta t}(z_{min} + z_{max})^2 / \left(1 - \frac{\Delta v}{\Delta t}z_{max}\right)}{2\left(z_{min} - \frac{\Delta v}{\Delta t}z_{max}z_{min} - z_{max} + \frac{\Delta v}{\Delta t}z_{min}^2\right)}. \quad (11)$$

Optimizing Acquisition

The spectrum and aliasing of a light field shown on a 3D display depends on a number of acquisition and display parameters, such as the number of cameras, their spacing, their aperture, the scene depth range, and display resolution. The decisions of a 3D cinematographer are dictated by a combination of artistic choices, physical constraints and the desire to make optimal use of acquisition and display bandwidths. Therefore, we analyze how these factors interact and influence the final spectrum and aliasing for 3D display.

First, we described the effect of camera aperture on the acquired bandwidth. Then, we describe the consequences of all the acquisition and display parameters, and show how this analysis can be used to optimize the choice of parameters during acquisition.

Finite Aperture Cameras

Chai et al., above, described the spectrum of light fields acquired with idealized pin-hole cameras. Here, we show that the finite aperture of real cameras has a band-limiting effect on the spectrum of pinhole light fields. Our derivation is based on a slightly different parameterization than shown in FIGS. 2, 3, 5 and 7.

As shown in FIG. 8A, we select the t-plane as the common focal plane of the cameras and $t_{in}$ is the plane of the lens 801 separated by a distance d, and the v-plane as the plane that contains the camera sensors. The planes $v_{in}$ and $t_{in}$ are separate by a distance 1, as before.

We assume that an aperture of size a lies on the lens at a distance f from the camera sensor. This is not exactly the case for real lenses, but the error is negligible for our purpose. According to a thin lens model, any ray l(v,t) acquired at the sensor plane corresponds to a weighted integral of all rays l (v,t) that pass through the lens:

$$l(v, t) = \frac{1}{f^2} \int_{\frac{v-a(f+d)}{2d}}^{\frac{v+a(f+d)}{2d}} \bar{l}(v, t)\cos^4 \alpha \, dv, \quad (12)$$

where the range of integration corresponds to the aperture as shown in FIG. 8A, and α is the angle between the sensor plane normal and the ray. Although we are working with 2D instead of 4D light fields and 1D instead of 2D lenses and sensors, our derivations equally apply to the higher dimensional case.

Then, imagine that we 'slide' the lens on a plane parallel to the v-plane. This can be expressed as the convolution $$l(v, t) = \frac{1}{f^2} \int_{-\infty}^{\infty} \bar{l}(x, y)b(v - x, y) \, dx\, dy, \quad (13)$$

where b(v,t) is the aperture filter. We ignore the $\cos^4$ term and define b as $$b(v, t) = \begin{cases} 1 & |v| < (v - a(f + d))/(2d), \quad t = 0 \\ 0 & \text{otherwise} \end{cases} \quad (14)$$

$$\int \int b(v, t) = 1.$$

In the Fourier domain, the convolution in Equation (13) is a multiplication of the spectra of the scene light field and the camera aperture filter. We approximate the spectrum of the camera aperture filter, which is a sine cardinal function (sinc) in φ translated along θ, by a box 802 of width 2πd/(a(f+d)) in φ translated along θ, as shown in FIG. 8B.

We now change coordinates back to the parameterization of the input light field, using a similar transformation as used for the resampling above, which results in the bandwidth 803 shown in FIG. 8C. A continuous light field observed through a lens with finite aperture a focused at the distance d is band limited to a sheared slab of width 2π/a and slope −d.

Bandwidth Utilization and Minimum Sampling

In a practical application, the number of available cameras is limited. The placement of the cameras can also be constrained. Therefore, it is desired to determine an optimal arrangement for the limited and constrained resources. With our resampling technique the setup can be estimated. Given the acquisition parameters, we can determine the optimal 'shape' of the resampling filter and analyze its bandwidth relative to the display bandwidth.

We realize that aliasing in the sampled input signal 101 is the main factor that reduces available bandwidth. There are two main options to increase this bandwidth, given a fixed number of cameras. First, we can decrease the camera baseline, which decreases the depth of the scene as it is mapped to the display. In this case, the input spectrum becomes narrower in the angular direction $\phi_d$ because of depth reduction. Obviously, decreasing the camera baseline too much may render scene depth imperceptible. Second, we can increase the camera aperture. However, if the camera aperture is too big, the acquired depth of field may become shallower than the display depth of field. We select the focal depth of the cameras to be equal to $f_{in}$, which means that the slab of the acquired input spectrum is parallel to the rectangular display bandwidth.

In an alternative setup, it is desired to acquire a given scene and keep objects at a certain depth in focus. Therefore, the minimum sampling rate required to achieve high quality results on a target display is determined. Intuitively, the sampling rate is sufficient for a given display when no reconstruction aliasing appears within the bandwidth of the display. Increasing the acquisition sampling rate beyond this criterion does not increase output quality.

We use Equation (11) to determine the focal distance $f_{in}$ and the baseline scaling s, which determine the mapping from input to display coordinates. Then, we derive the minimum sampling rate, i.e., the minimum number and resolution of cameras, by finding the tightest packing of replicas of the input spectrum such that none of the non-central replicas overlap with the display prefilter. It is now possible to reduce the number of required cameras to the angular resolution of the display. However, achieving this is often impractical because larger camera apertures are required.

EFFECT OF THE INVENTION

The invention provides a method and system for sampling and aliasing light fields for 3D display devices. The method is based on a ray space analysis, which makes the problem amenable to signal processing methods. The invention determines the bandwidth of 3D displays, and describes shallow depth of field behavior, and shows that antialiasing can be achieved by a linear filtering ray space. The invention provides a resampling algorithm that enables the rendering of high quality scenes acquired at a limited resolution without aliasing on 3D displays.

We minimize the effect of the shallow depth of field of current displays by allowing a user to specify a depth range in the scene that should be mapped to the depth of field of the display. The invention can be used to analyze the image quality that can be provided by a given acquisition and display configuration.

Minimum sampling requirements are derived for high quality display. The invention enables better engineering of multiview acquisition and 3D display devices.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for acquiring and displaying light fields, comprising, the steps of:

reconstructing, according to an acquisition parameterization, a continuous light field from input samples of an input light field of a three dimensional scene acquired by a plurality of cameras;

reparameterizing, according to a display parameterization, the continuous light field; and prefiltering the reparameterized light field and sampling the prefiltered light field to produce output samples having the display parametrization, and displaying the output samples as an output light field using a three dimensional display device, wherein the display parameterization is defined in part by a t-plane plane of the parallax-barrier defining t coordinates, and a v-plane of the lenticular screen defining v coordinates, and a pixel spacing of the lenticular screen is $\Delta v$, a spacing of the gaps in the parallax-barrier is $\Delta t$, a separation between the lenticular screen and parallax-barrier is f, and depth is z, and wherein a display bandwidth is limited according to $$H(\phi, \theta) = \begin{cases} 1 & \text{for } |\phi| \leq \pi/\Delta v \text{ and } |\theta| \leq \pi/\Delta t \\ 0 & \text{otherwise} \end{cases},$$

where H is a display prefilter, and angular and spatial frequencies are, respectively, $\phi$ and $\theta$.

2. The method of claim 1, in which the prefiltering matches a Nyquist limit of a display bandwidth according to the display parameterization.

3. The method of claim 1, in which the three dimensional display device is an automultiscopic display device.

4. The method of claim 1, in which the input samples are in a form of sequences of images acquired by the plurality of cameras.

5. The method of claim 1, in which the plurality of cameras are arranged as a horizontal linear array.

6. The method of claim 1, in which the three dimensional display device includes a plurality of projectors, and a display screen includes a parallax-barrier mounted on a front side of a vertically oriented lenticular screen.

7. The method of claim 1, in which a ray of the output light field intersecting the t-plane at one location corresponds to one multi-view pixel, and each intersection of the ray with the v-plane is a view-dependent subpixel, and the a number of the multi-view pixels defines a spatial resolution and a number of view-dependent subpixels per multi-view pixel defines the angular resolution of the display parameterization.

8. A system for acquiring and displaying light fields, comprising:

a plurality of cameras configured to acquire an input light field of a three dimensional scene;

means for reconstructing, according to an acquisition parameterization, a continuous light field from input samples of the input light field;

means for reparameterizing, according to a display parameterization, the continuous light field;

means for prefiltering the reparameterized light field and sampling the prefiltered light field to produce output samples having the display parametrization;

a three dimensional display device configured to display the output samples as an output light field, wherein the display parameterization is defined in part by a t-plane plane of the parallax-barrier defining t coordinates, and a v-plane of the lenticular screen defining v coordinates, and a pixel spacing of the lenticular screen is $\Delta v$, a spacing of the gaps in the parallax-barrier is $\Delta t$, a separation between the lenticular screen and parallax-barrier is f, and depth is z, and wherein a display bandwidth is limited according to $$H(\phi, \theta) = \begin{cases} 1 & \text{for } |\phi| \leq \pi/\Delta v \text{ and } |\theta| \leq \pi/\Delta t \\ 0 & \text{otherwise} \end{cases},$$

where H is a display prefilter, and angular and spatial frequencies are, respectively, $\phi$ and $\theta$.

* * * * *